United States Patent [19]

Tang et al.

[11] 4,253,114
[45] * Feb. 24, 1981

[54] HIGH SECURITY SUBSCRIPTION TELEVISION SYSTEM EMPLOYING REAL TIME CONTROL OF SUBSCRIBER'S PROGRAM RECEPTION

[75] Inventors: Danny Q. H. Tang, Northampton; Bark L. Yee, Allentown, both of Pa.

[73] Assignees: Twin County Trans-Video Inc., Allentown, Pa.; Home Life Insurance Co., New York, N.Y.

[*] Notice: The portion of the term of this patent subsequent to Mar. 28, 1995, has been disclaimed.

[21] Appl. No.: 946,026

[22] Filed: Sep. 26, 1978

Related U.S. Application Data

[60] Continuation of Ser. No. 825,468, Aug. 17, 1977, abandoned, which is a division of Ser. No. 675,138, Apr. 8, 1976, Pat. No. 4,081,831.

[51] Int. Cl.³ .................................................. H04N 1/44
[52] U.S. Cl. ........................................ 358/114; 358/120; 358/121; 358/122; 358/123; 358/124
[58] Field of Search ................................. 358/114–124

[56] References Cited

U.S. PATENT DOCUMENTS

| | | | |
|---|---|---|---|
| 3,527,877 | 9/1970 | Walker | 358/124 |
| 3,668,307 | 3/1970 | Face et al. | 358/114 |
| 3,777,053 | 12/1973 | Wittig et al. | 358/117 |
| 3,801,732 | 4/1974 | Reeves | 358/124 |
| 3,814,841 | 6/1974 | Ulicki | 358/86 |
| 3,852,519 | 12/1974 | Court | 358/122 |
| 3,885,089 | 5/1975 | Callais et al. | 358/122 |
| 3,886,302 | 5/1975 | Kosco | 358/86 |
| 3,914,534 | 10/1975 | Forbes | 358/122 |
| 3,916,091 | 10/1975 | Kirk, Jr. et al. | 358/86 |
| 3,919,462 | 11/1975 | Hartung et al. | 358/124 |
| 3,934,079 | 1/1976 | Barnhart | 358/86 |
| 3,982,062 | 9/1976 | Simons | 358/122 |

Primary Examiner—Stephen C. Buczinski
Attorney, Agent, or Firm—Schwartz, Jeffery, Schwaab, Mack, Blumenthal & Koch

[57] ABSTRACT

A high security subscription television system which includes the feature of dynamic scrambling and descrambling of cable-connected television signals in response to real-time coded control signals. The system also has the ability to precisely tune the frequency converter unit at the subscriber's site, in response to real time coded control signals provided by a computer at the central transmitting station. Various methods of scrambling and descrambling are described which use manipulation of the video signals at the baseband video level, and also at the RF level. Alternate embodiments of the descramblers include a secondary source for the reference carrier signal required for proper descrambler operation. In an ultra-stable embodiment of a subscriber's control terminal, a single crystal controlled master oscillator is used to control the frequency conversion unit, to provide a clean reference carrier signal for the descrambler unit, and to tune the control signal receiver, thereby removing the need for frequent fine tuning control adjustments, and further allowing simplified system design and fabrication.

17 Claims, 19 Drawing Figures

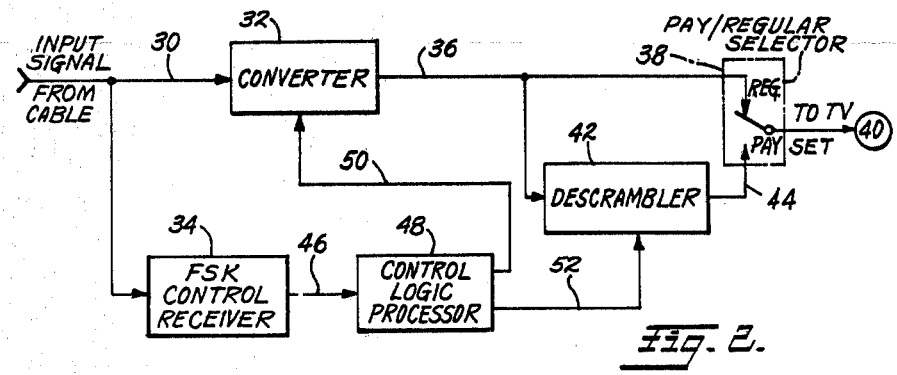
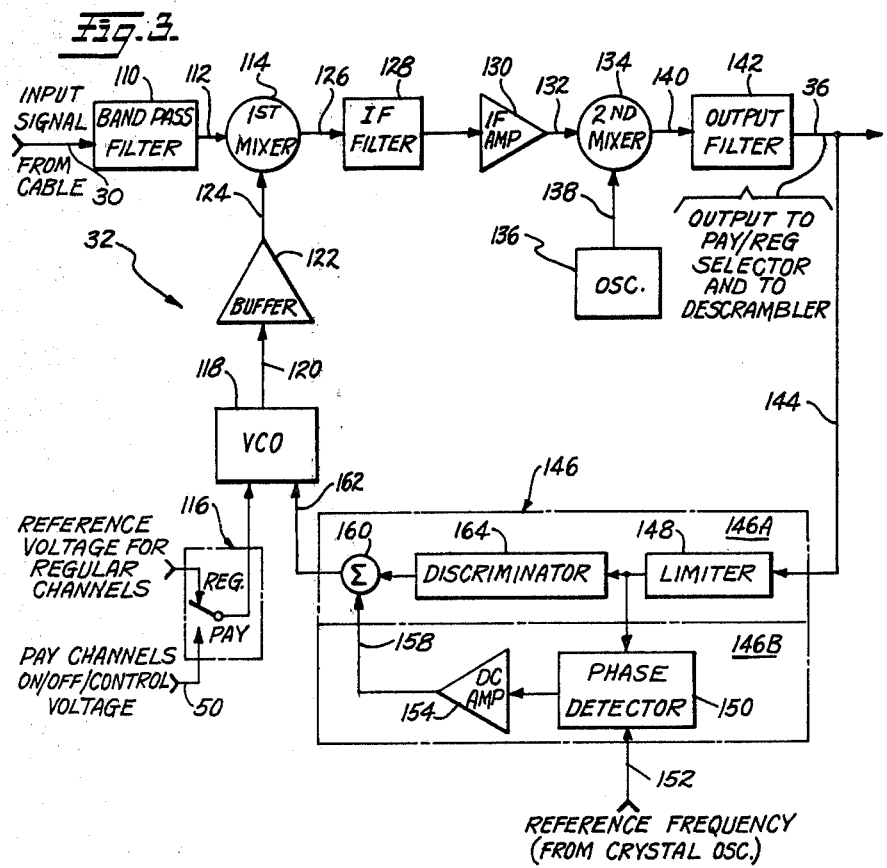

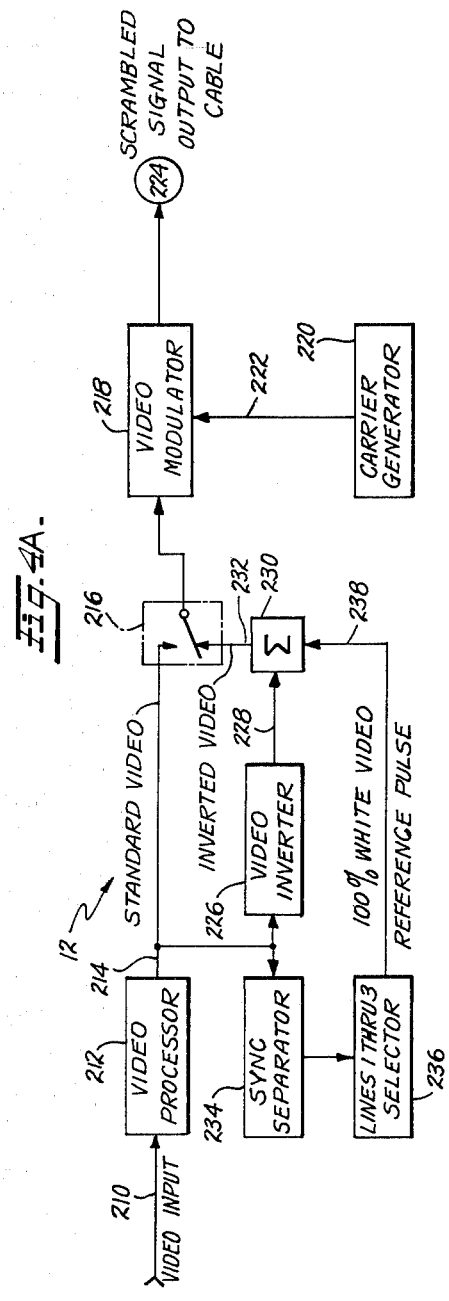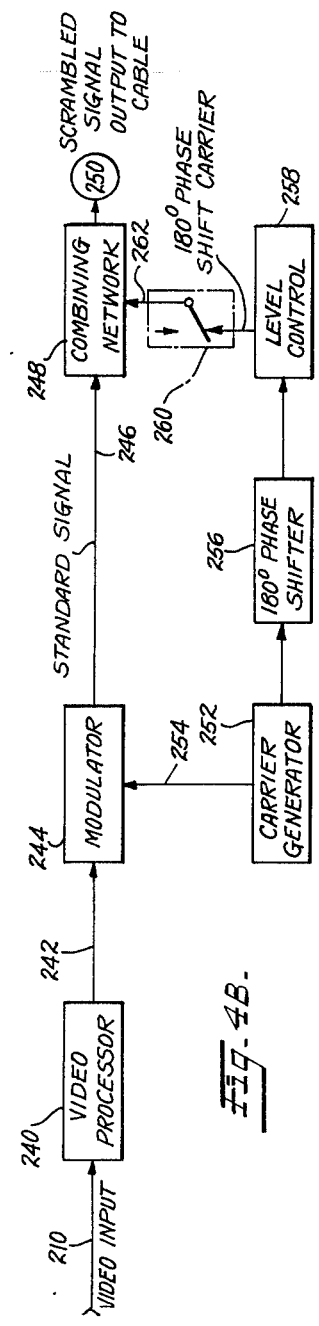

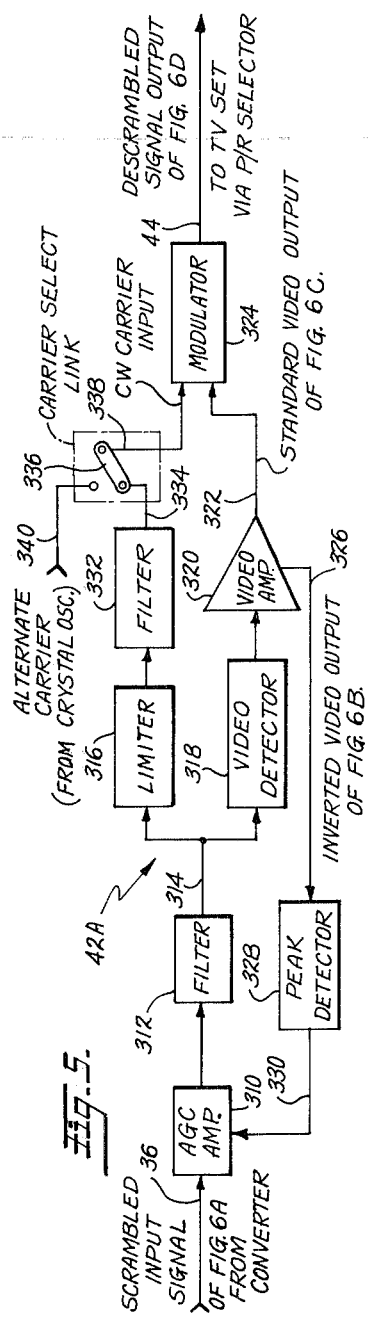

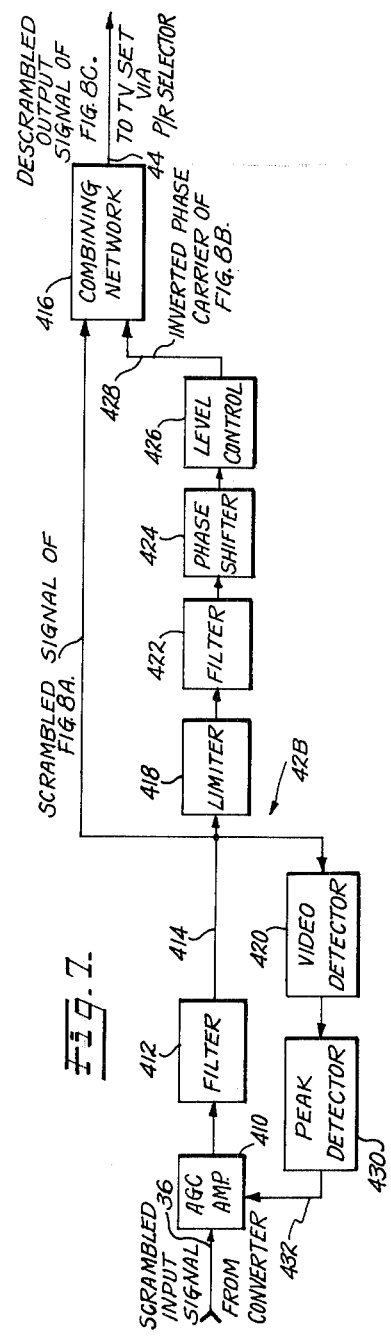
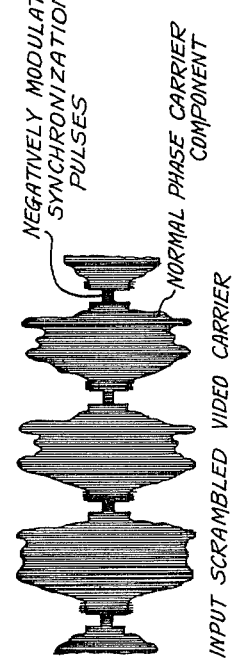
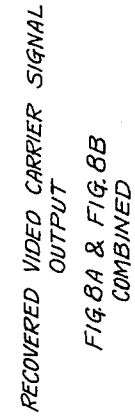
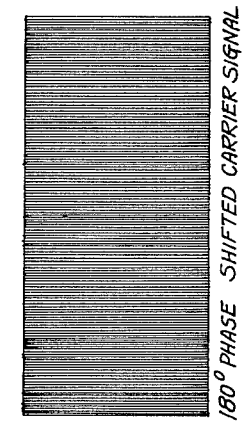

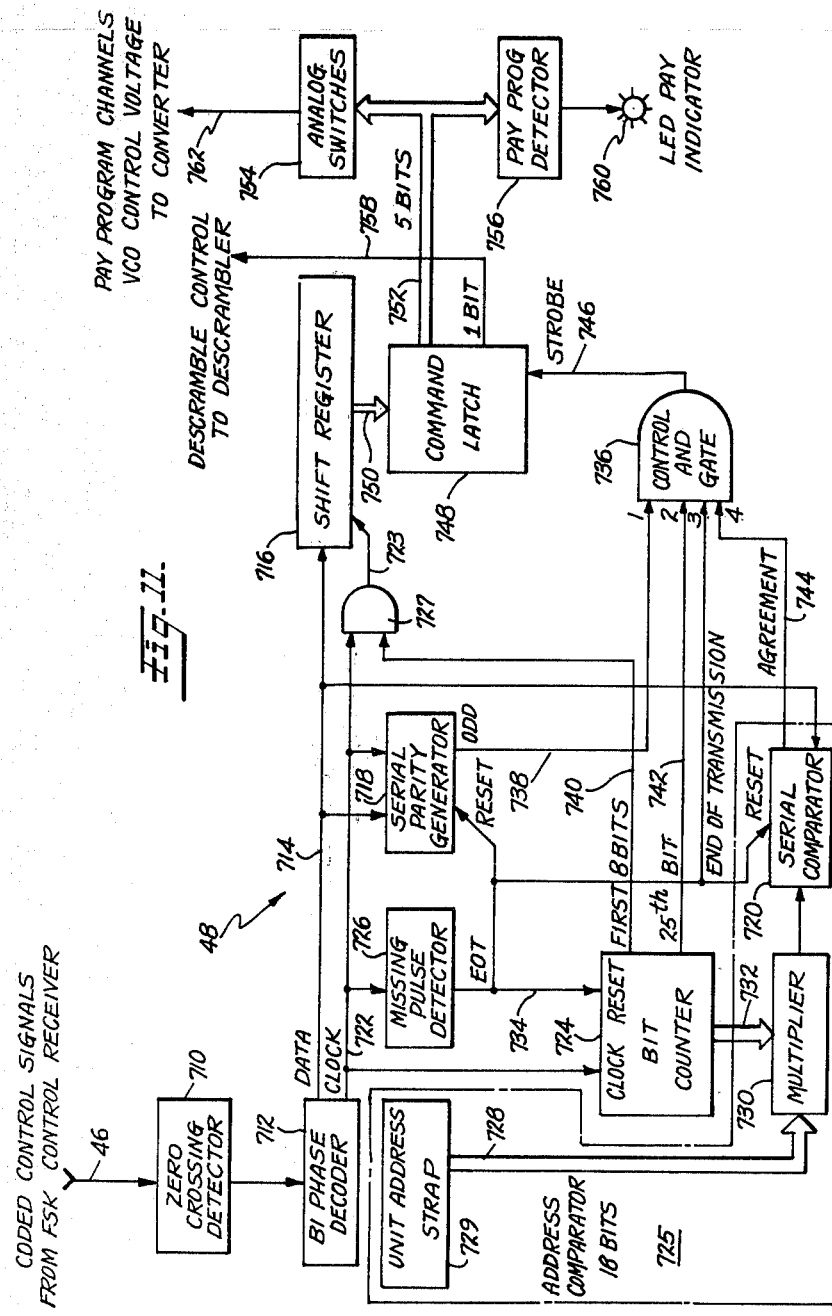

HIGH SECURITY SUBSCRIPTION TELEVISION SYSTEM EMPLOYING REAL TIME CONTROL OF SUBSCRIBER'S PROGRAM RECEPTION

This is a continuation of application Ser. No. 825,468, filed Aug. 17, 1977 (now abandoned); which is a divisional application of Ser. No. 675,138, filed Apr. 8, 1976 (now U.S. Pat. No. 4,081,831, issued Mar. 28, 1978).

BACKGROUND OF THE INVENTION

The present invention relates to subscription television systems and more particularly to methods and apparatus for implementing a high security pay television system wherein real time control of each subscriber's control unit is exercised by the central transmitting station.

It is well known in the subscription television field to provide means for insuring that only authorized subscribers may gain useful access to transmitted programming materials. Since its inception, the pay television industry has employed a wide range of techniques to assure that the proper revenue is derived in payment for programs provided. Initially, periodic flat rate charges were levied on all subscribers connected to a particular network, and the subscribers were then provided with a straightforward conversion device enabling reception of all programming transmitted. As the industry developed it became obvious that the early systems were too susceptible to abuse by unauthorized use of the converters, and equally importantly did not provide the degree of control required to differentiate between premium, higher cost, programs and more routine subject matter. To meet the new requirements imposed by the subscribers' desire to receive a wider mix of programs, and to assure proper pro rata revenue on a per-program basis, a number of more selective equipment devices evolved. The devices afforded the individual subscriber a wide choice of programs and provided the means whereby the CATV operator could exercise an increased degree of control against the unauthorized use of the programming.

Illustrative of prior art systems wherein a moderate degree of security is employed, is U.S. Pat. No. 3,885,089 to Callais et al which describes a system wherein scrambling of television programs is achieved by transmitting in an alternating sequence a pair of television programs on a pair of channels. The receiving stations then assemble a complete program by deinterleaving the transmitted waveforms. An exemplary disclosure of a prior art effort to exert positive control of the channel frequency in use at the subscriber's location is shown in the U.S. Pat. No. 3,914,534 to Forbes. Forbes teaches the use of control signals originating at the central station to enable coding means already resident in the subscriber's terminal to determine the channel frequency to be enabled. Other illustrative prior art is found in the U.S. Pat. No. 3,852,519 to Court, and in U.S. Pat. No. 3,919,462 to Hartung et al.

SUMMARY OF THE INVENTION

The present invention is primarily directed towards simple and effective methods and apparatus for providing a high degree of security in, and positive control of a subscription television system wherein a large number of subscribers are cable connected to a central transmitting facility. In general terms, the desired high degree of security is achieved by a combination of techniques including scrambling and descrambling the television signals in a random manner controlled by the central facility. In the video inversion techniques employed, which may be implemented at baseband video or RF levels, the equipment at the subscriber's location has no a priori knowledge of the scrambling sequence being employed at the central facility. Positive system control is exercised in part by a technique wherein the central facility maintains real time control of the channel tuning of each subscriber's frequency converting unit when pay television channels are being received.

Therefore it is a primary object of the present invention to overcome the limitations and disadvantages of the prior art and to provide improved apparatus and methods for transmission and reception of television programming in CATV-like distribution systems.

It is a further object of the present invention to provide a subscriber's control unit for use in a subscription television system which provides a high degree of security by the inclusion of a plurality of encoding and enabling techniques operative in combination.

It is a further object of the present invention to provide simple means for scrambling and descrambling television signals to prevent reception by unauthorized subscribers without introducing unwarranted equipment complexity, or critical subscriber operating adjustments.

It is a still further object of the present invention to provide a positive control subscription television system wherein the central transmitting station controls the channel selection of subscriber's control unit during reception of pay channels.

It is a still further object of the present invention to provide a positive control subscription television system wherein the central transmitting station provides real time coded program scrambling and descrambling information for use throughout the cable network.

A yet further object is to provide an ultra stable subscriber's control unit which is inexpensive to produce and which requires a minimum of manual intervention by the subscriber during program selection and viewing.

BRIEF DESCRIPTION OF THE DRAWINGS

These objects as well as additional features and advantages of the present invention will become apparent to those skilled in the art as the description proceeds with reference to the accompanying drawings wherein:

FIG. 2 is a simplified block diagram of a preferred embodiment of a subscriber's control unit according to the present invention;

FIG. 3 is a block diagram of a frequency converter unit illustrating the local oscillator control method;

FIGS. 4A–4B are block diagrams of video scrambling modulators wherein the inversions are accomplished at the baseband video level and the RF level respectively;

FIG. 5 is a block diagram of a descrambler showing descrambling at the baseband video level;

FIGS. 6A–6D show the key TV waveforms associated with the baseband video descrambling method of FIG. 5;

FIG. 7 is a block diagram of an alternate embodiment of a descrambler which operates at the RF signal level;

FIGS. 8A–8C show the key TV waveforms associated with the RF descrambling method of FIG. 7;

FIG. 11 is a schematic diagram partly in block of a preferred embodiment of a control logic processor;

DESCRIPTION OF THE PREFERRED EMBODIMENT

Figure 1:
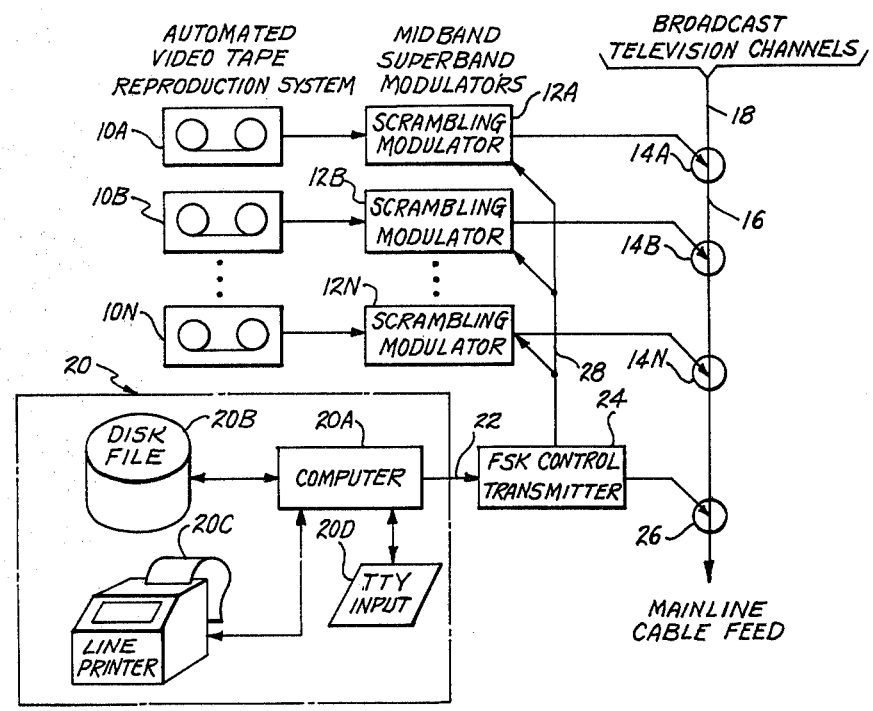
FIG. 1 is a simplified block diagram of a central transmitting station of a subscription television system.

Referring to FIG. 1, there is shown a simplified block diagram of an illustrative embodiment of a central transmitting station associated with a subscription television system. Briefly, the central transmitting station assembles, processes and transmits a plurality of television programs simultaneously via a broadband RF cable to a plurality of subscribers as is well known and conventional in the CATV art. Both recorded programs available on video tapes, and programs obtained by reception of the conventional VHF/UHF broadcast signals are typically provided on the cable. The diagram outlines in functional form those elements needed to implement the positively controlled transmission of multiple channel programming to the CATV network. Hereinafter for brevity, the central transmitting station will be referred to as the CTS or alternately as the head end.

A plurality of automatic video tape reproduction systems, (hereinafter video tape machines) 10A–10N are shown as the primary source of television signals for which positive control is required so that specific charges to authorized subscribers may be made. The output signals from the video tape machines 10A–10N are applied to a corresponding plurality of scrambling modulators 12A–12N and thereafter via a plurality of directional couplers 14A–14N, whereby the scrambled television signals are impressed on a broadband coaxial cable 16 for distribution throughout the CATV network. Also impressed on the cable 16 are broadcast television signals which have been locally received by means of well placed antenna systems (not shown), and broadcast television signals which have been patched into the CATV CTS via landlines (not shown) and the like. These broadcast television signals are shown as simply entering the CATV CTS via a line 18 where they are also impressed on, and available via the cable 16.

As is well known in the CATV art these multiple sources of television signals are transmitted at frequencies outside of the broadcast television frequency bands, on channel allocations reserved for CATV operations. Also, the transmitted signals are complete and standard in that they contain the usual video, sync and audio signal components as defined by the National Television Standards Committee (NTSC). These standard signals relationships are required for proper operation when used in conjunction with the conventional VHF/UHF television receivers. Hereinafter, use of the phrase "standard television signal" and similar phrases, is meant to designate those characteristics and parameters as set forth in the NTSC specifications and in the subsequent generally accepted revisions to and modifications of the specifications.

A central controlling subsystem 20 is shown as containing a computer 20A having a number of input/output devices, such as a disc file 20B, a line printer 20C and a teletype terminal 20D. The central controlling subsystem 20 does not form part of the instant invention per se, although reference is made herein to routine signals or functions originating within the subsystem. Briefly, the control subsystem provides a coded control signal stream consisting of a series of subscribers' addresses, scrambling signals, and channel frequencies which are routed via a line 22 to an FSK control transmitter 24. The output of the FSK control transmitter 24 is applied via a directional coupler 26 to the cable 16. An auxiliary output from the FSK control transmitter 24 is applied via a line 28 to all of the scrambling modulators 12A–12N. This path provides the control signals for time-varying the scrambling such that dynamic control is exercised.

Thus, the cable 16 carries a plurality of radio frequency signals comprising: (a) television programs derived from reception of broadcast signals; (b) television programs reproduced locally by video tape means, which may or not be scrambled; and (c) a stream of coded control signals originating at the CTS—all of which are transmitted to the subscribers connected to the CATV network. The novel means for scrambling the video tape generated programs, a portion of the inventive concept of the present invention, will be described in more detail below.

Referring now to FIG. 2, there is shown a simplified block diagram of a subscriber's control unit according to the instant invention. Hereinafter, for brevity, the subscriber's control unit will be referred to as the SCU. The diagram outlines in functional form those elements needed to implement the positively controlled reception of multiple channel programming material at an individual CATV subscriber's location.

An input signal consisting of a plurality of television programs in complete radio frequency signal form, and auxiliary coded control signals also at radio frequencies, are routed from the CTS via the coaxial cable to each subscriber's location. The input signal is thereafter connected via an input line 30 to the input of a converter 32, and to the input of an FSK control receiver 34. The converter 32 has as its primary function the conversion of one particular CATV channel to a predetermined single frequency band suitable for direct use via an unused channel of a conventional (standard) television set (not shown) at the subscriber's location. As previously noted, the term "standard" implies having characteristics compatible with the NTSC specifications. Typically, the output frequency of the converter 32 is adjusted to utilize the band reserved for either channel 2, or 3 of the VHF broadcast television spectrum. An output of the converter 32 is routed via a line 36 to a first input of a program type selector 38 hereinafter referred to as the Pay/Regular selector, which may be characterized functionally as a single-pole-double-throw switch, having its movable pole connected to an output terminal 40. Line 36 is further connected to an input of a descrambler 42, whose output is in turn routed via a line 44 to a second input of the Pay/Regular selector 38. For reception of free CATV programming material, that for which no charge is made, and hence does not require scrambling, the Pay/Regular selector 38 is retained in the position as shown and provides the frequency converted television programs to the subscriber's TV set without further signal processing. For reception of scrambled television programs, which is restricted to specifically authorized users, the descrambler 42 is utilized to descramble the program prior to being routed through the Pay/Regular selector 38 and output terminal 40 to the subscriber's TV set. In either position of the Pay/Regular selector 38, standard composite television signals are available (descrambled when necessary) at the output terminal 40 for direct connection and use by the subscriber.

The FSK control receiver 34 receives control signals directly from a selected frequency portion of the input signal supplied on the cable via the line 30, and is used to generate the enabling control signals which allow the reception of scrambled television signals at a particular subscriber's location. The receiver extracts the coded control signals, which are frequency shift keyed modulated on a VHF carrier frequency, corresponding to the digital logic signals originating at the head end. The output of FSK control receiver 34 is connected via a line 46 to the input of a control logic processor 48. The control logic processor 48 performs an address comparison to assure that the program material is being routed to the proper subscriber; performs a function decoding which effectively establishes the local oscillator frequency for the converter 32 via a line 50; and further provides a jam code signal to the descrambler 42 via a line 52.

In subsequent sections hereinbelow, a detaileed description of each of the generalized blocks described will be provided.

Referring now to FIG. 3, there is shown a detailed block diagram of the converter 32. Basically, this is a dual conversion receiver of the superhetrodyne type and provides the required selectivity and sensitivity for the frequency conversion portion of the SCU. The input signal from the cable is applied via the line 30 to a band pass filter 110, and thereafter via a line 112 to a first input of a first mixer 114. A logically derived DC voltage used to establish the pay channel selecting frequency (as will be described below in connection with the control logic processor 48) is applied to a second input of the converter 32, via a line 50, and thereafter directly to a first input of a Pay/Regular selector 116. (As with its counterpart, element 38 of FIG. 2, this Pay/Regular selector 116 may also be functionally characterized as a single-pole-double-throw switch, both of which are actuated in concert). The movable pole of Pay/Regular selector 116 is applied to a first input of a VCO 118. The output of the VCO 118 is applied via a line 120 to an amplifier-buffer 122, and thereafter via a line 124 to a second input of the first mixer 114. The heterodyned output of the first mixer 114 is available on a line 126 for application to an IF filter 128 whose output is routed to an IF amplifier 130. Functionally, the band pass filter 110 serves to minimize any possible coupling of the VCO 118, the first local oscillator signal, back into the cable system thereby preventing possible disruption of the reception at other subscriber's locations. The first mixer 114 is of conventional double-balanced type and accepts the RF signal input from the line 112, the local oscillator input from the line 124, and provides the usual sum and different frequencies at its output via the line 126. Thereafter, the proper one of these two output signals is filtered and amplified by IF filter 126 and IF amplifier 130 respectively. The output of IF amplifier 130 appears on a line 132 where it is fed to a first input of a second mixer 134.

An oscillator 136 supplies a fixed frequency output via a line 138 to a second input of the second mixer 134. The output of second mixer 134 is coupled via a line 140 to an output filter 142. The output filter 142 delivers the selected predetermined television signal, which illustratively may be adjusted to be in the bands associated with either channel 2 or channel 3, to the subscriber's TV receiver via the output line 36. An additional output from the output filter 142 is routed via a line 144 to a phase lock loop/AFT circuit 146. It should be noted that the oscillator 136, the second local oscillator signal, is of fixed, predetermined frequency. Various frequencies of an illustrative embodiment of the converter 32 are provided below at the end of the detailed description.

The phase lock loop/AFT 146 is shown as comprised of an AFT section 146A and a phase lock loop section 146B. Common to both sections is a limiter 148 which receives its input via the line 144 and whose output is applied to a first input of a phase detector 150. The output of a fixed frequency crystal oscillator (not shown) is applied via a line 152 to a second input of the phase detector 150 whose output is connected directly to a DC amplifier 154. The output of DC amplifier 154 is applied via a line 158 to a first input of a summing junction 160 and thereafter via a line 162 to a second input of the VCO 118. The output of limiter 148 is also applied to a discriminator 164 whose output is coupled via a line 168 to a second input of the summing junction 160. Functionally, the phase lock loop/AFT 146 serves to provide a closed loop vernier tuning of VCO 118 such that the signal output from the output filter 142 is maintained at precisely the frequency established by the crystal oscillator as applied to the converter 32 via the line 152. Also, the phase lock loop 146B assures a phase stable output signal on the line 36. This is accomplished by means of a DC control voltage out of the phase detector 150 which represents the difference in phase between the fixed frequency oscillator via line 152 and the output signal from output filter 142. This DC voltage is applied to VCO 118 in the conventional manner so as to provide the required vernier tuning of the converter portion of the SCU.

Typical frequencies associated with the various elements described above, which may be considered as an illustrative embodiment only, are as follows: The band pass filter 110 may have a bandwidth of from 50–300 MHz; the VCO 118 may produce frequencies in the range of 433–700 MHz; the IF filter 128 may have a center frequency of 375 MHz, with a 6 MHz bandwidth; the second local oscillator 136 may have a frequency of 433 MHz; and the fixed frequency crystal oscillator from line 152 may have a frequency of 55.25 MHz. The frequencies described herein would produce an RF output signal on the line 36 having a video carrier frequency at 55.25 MHz, which then would be receivable by a standard television receiver by tuning to VHF channel 2. Obviously, other combinations of frequencies may be used herein equally successfully.

Referring to FIG. 4A, a detailed block diagram of a baseband video scrambling modulator is shown. In brief, the purpose of this portion of the CTS is to provide the required system security by scrambling the pay television programs, and more specifically to scramble the signals in a dynamic manner. The dynamic scrambling method consists of the scrambling of successive fields of the television signals in a time coded way such that—at least for moderately long intervals—a simply repetitive scrambling scheme is not recognizable. Thus, the output of the scrambler will be a complete television program signal which will be inversely scrambled for some fields, and standard (non-scrambled) for other fields.

The input video signal, as derived from a video tape reproduction system or the like, is applied via a line 210 to a conventional video processor 212 and thereafter via a line 214 to subsequent locations within the scrambler 12. A first path routes the video signal to a first input of a scrambler commutator 216, shown in highly simplified form as a single-pole-double-throw switch but which may be any one of a variety of high speed, solid state switching means as are well known and conventional. The output of the scrambler commutator 216, taken from the movable pole, is routed to a first input of a video modulator 218. A carrier generator 220 provides the required CATV channel video carrier frequency via a line 222 to a second input of the video modulator 218. The video modulator 218 performs the conventional amplitude modulation of the two input signals and provides the output signal at a terminal 224 for subsequent application to the distribution cable. It should be noted that it is preferable for the output signal at terminal 224 to be of the vestigial sideband suppressed type. A second path routes the video signal to a video inverter 226 and thereafter via a line 228 to a first input of a summing junction 230. The output of the junction 230 is routed via a line 232 to a second input of the scrambler commutator 216. The video inverter 226 is merely a polarity inverting amplifier which, when its output is selected by the scrambling commutator 216, applies its inverted output to the video modulator 218 to produce the inversely modulated (scrambled) waveform. The scrambling method may be more readily visualized by a review of a tabulation of the nominal percentages of amplitude modulation of the peak carrier amplitude of the output signal as follows:

| % | Standard | Scrambled |
|---|---|---|
| 100 | sync | maximum white |
| 75 | black | — |
| 40 | — | black |
| 15 | maximum white | sync |

A further path routes the video signal via the line 214 to a sync separator 234, and thereafter to a lines 1-3 selector 236. These two elements are used to generate an amplitude reference pulse for insertion into the scrambled television signal for use in establishing a proper descrambler output signal level, as will be described in connection with the descrambler embodiment of FIG. 5. Referring briefly to FIG. 6A, where the inverted waveform as is shown at terminal 224 would appear, it will be noted that the sync levels which generally represent the highest transmitted power levels are not available to establish a useful AGC level. Thus the amplitude reference pulse which represents a 100% white level is generated for nominally 200 microseconds (three horizontal scan lines) during the blanking period just before the vertical sync pulse interval and is routed via a line 238 to a second input of the junction 230 where it is summed into the scrambled signal.

The actuating means (not shown) for the scrambler commutator 216 may take a number of forms, including a pseudo random generator device which is strobed at some multiple of the vertical sync frequency to produce a time-chopped scrambling sequence in synchronism with the frame rate, which sequence may have an arbitrarily long repetition cycle. For present purposes the major feature required of the actuating means for the scrambler commutator 216 is that the descramblers at the subscriber's control units, which do not have a prior knowledge of the encoded sequence, also have a means for responding to the same coded actuations. These means are provided as described below.

Referring now to FIG. 4B, a detailed block diagram of a scrambling modulator operating at the RF level is shown. Functionally, this portion of the CTS fulfills the same purpose as the unit described in connection wih FIG. 4A. As before, the scambling method consists of the scrambling of successive fields of the television signals in a time coded way.

The input video signal, as derived from a video tape reproduction system or the like, is applied via a line 210 to a conventional video processor 240, and thereafter via a line 242 to a first input of a video modulator 244. A carrier generator 252 is connected via a line 254 to a second input of the modulator 244. The output of the modulator 244, which is a standard amplitude modulated television signal (suppressed vestigial sideband) is routed via a line 246 to a first input of a combining network 248. The output of combining network 248 is applied to an output terminal 250 for subsequent application to the distribution cable. A second output of the carrier generator 252 is applied to a 180 degree phase shift network 256 and to a level control 258. The output of level control 258 is applied to a first input of a scrambler commutator 260, which performs the identical function as described in connection with the previous embodiment. The movable contact of the scrambling commutator 260 is connected via a line 262 to a second input of the combining network 248. Functionally, the combining network 248 accepts the standard amplitude modulated TV signal on its first input, and performs an algebraic summation of that waveform and the 180 degree phase shifted carrier waveform provided on its second input. The resulting output waveforms are then best described by reference to FIGS. 8A-8C. Therein, it will be noted that upon algebraic summation of an amplitude modulated waveform, the waveform of FIG. 8A, and a carrier waveform (having twice the peak amplitude of the amplitude modulated waveform, not shown to scale) wherein the carrier has been phase shifted 180°, as in FIG. 8B, the resulting waveform will experience a complete inversion of the amplitude modulation, as shown in FIG. 8C. By actuation of the scrambling modulator 260 in synchronism with various multiples of the field rate, a scrambled television waveform is produced having the desired characteristics and predetermined amplitude ratios as outlined in the tabulation in connection with FIG. 4A.

Descrambler Description—Baseband Video Method

A basic descrambler circuit as shown in block diagram form in FIG. 5. Functionally, the descrambler reconstructs the scrambled television signals, which have been scrambled at the central transmitting station to prevent their unauthorized reception, back into standard format. The circuit as shown accomplishes this reconstruction at the baseband video level. Alternate embodiments described hereinbelow disclose how similar signal descrambling may be accomplished by operating on the scrambled signals at the RF level.

Briefly, the descrambler 42A receives a scrambled input signal from the converter 32 on the line 36 and produces a standard television signal at its output on the line 44. The scrambled input signal from the converter 32 consists of an inverted video TV waveform such that a standard TV receiver cannot successfully process the sync pulses, in addition to producing a negative picture image, therefore precluding the useful reception of a TV program.

The RF signal containing the inverted video waveform is applied via the line 36 to a first input of an ACC amplifier 310. Thereafter, the signal is routed to a filter 312, and via a line 314 to a limiter 316 and also to a video detector 318. The video detector 318, of conventional design, serves to amplitude envelope detect the video signal. The detected video signal is applied to a video amplifier 320 and thereafter via a line 322 to a first input of a modulator 324. A second output of the video amplifier 320 is applied via a line 326 to a peak detector 328. The output of the peak detector 328 is applied via a line 330 to a second input of the AGC amplifier 310 thereby forming a closed path automatic gain control loop. It is desirable that the video input to the modulator 324 be of substantially constant peak amplitude such that proper modulation of the reconstructed signal may be accomplished. The AGC loop assures this.

Figure 13:
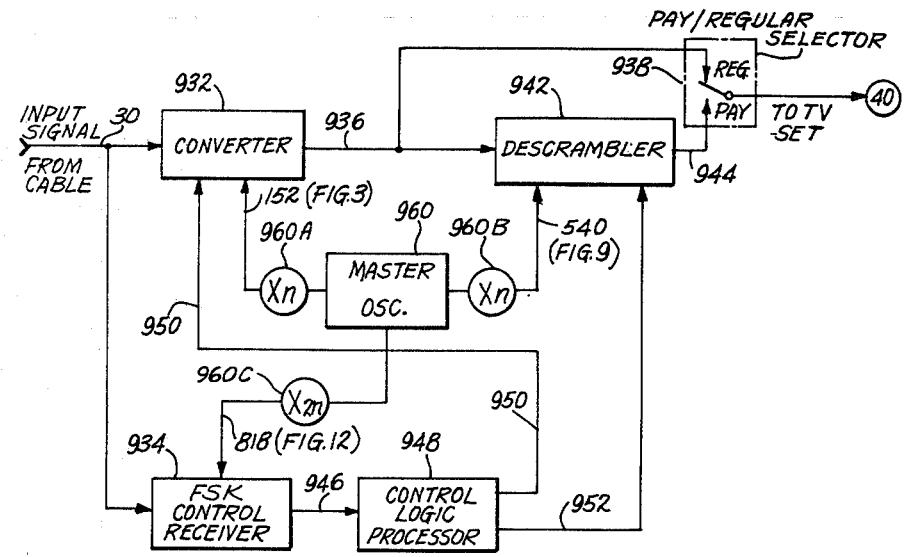
FIG. 13 is a block diagram of a high stability embodiment of the subscriber's control unit illustrating the multiple use of a master crystal oscillator.

The limiter 316 receives the amplified RF signal via the line 314 and performs a double-ended amplitude clipping action on the waveform. The output of limiter 316, which now contains only the RF carrier information with all amplitude information removed, is applied to a filter 332 and thereafter via a line 334, through a link 336 and via a line 338 to a second input of the modulator 324. For present purposes it may be assumed that the output of filter 332, the carrier signal only, is applied directly to the second input of modulator 324. The final process in the descrambler is accomplished in the modulator 324 which is a conventional TV amplitude modulation circuit causing the video input, from the line 322, to be amplitude modulated on the carrier input, from the line 332, in the conventional (lower sideband attenuated) manner. Two features worthy of note in this final modulation process are: Firstly, as the modulation percentage depends on the relative magnitudes of the input carrier and modulating signal waveform, these input magnitudes must be closely controlled. To this end, use is made of the 100%, white video amplitude reference pulse generated in the scrambling modulator, which was described in connection with FIG. 4A. This pulse appears in the scrambled signal as the most positively modulated signal and is used as a good amplitude reference for the closed AGC loop. The peak detector 328 is especially configured to operate on this reference pulse which may be of order 200 microseconds in duration. In addition to the clipped and filtered carrier signal of the line 334, alternate sources of the required carrier signal may be inserted into the modulator 324 by transferring the select link 336. Via an input line 340, either a crystal oscillator or a phase lock loop regenerated carrier signal may be injected into the modulator 324. An embodiment describing the phase lock loop method for regenerating a clean carrier signal will be described in connection with FIG. 10. An embodiment showing the use of a crystal oscillator for this purpose is shown in FIG. 13. Secondly, it is essential that the correct polarity of video be applied to the modulator 324 in order that the sync signals represent the highest amplitude of the reconstructed amplitude modulated TV waveform. This is assured by having an odd number of sign changes in the video amplifier chain between the input signal on line 36 and the input to the modulator 324 on the line 322. Therefore, the output of modulator 324 will consist of a standard TV waveform having the sync signals of the proper modulation percentage and other necessary characteristics such that they can be processed by a standard TV receiver. The output of modulator 324 is applied via the line 44 to the Pay/Regular selector 38 of the SCU and thereafter with no further signal processing directly to the subscriber's television receiver.

To further clarify this video inversion technique, reference is made to FIGS. 6A–6D which show waveforms associated with the descrambler. FIG. 6D shows an amplitude modulated composite television waveform as normally transmitted by a TV broadcasting station and the type of signal with which a standard TV receiver can most successfully operate. This waveform will appear on the output line 44. FIG. 6A shows a wavefrom of a composite television signal wherein the video levels have been inverted, (scrambled) as would appear on the input line 36. In this scrambled waveform, it should be noted that the sync signals rather than being the highest amplitude portion of the modulated waveform, now occupy the portion where the modulation depth is the lowest. This waveform would not successfully be processed by a standard TV receiver, as the receiver circuitry is designed to recognize the sync signals from the highest peak amplitude available.

FIGS. 6B and 6C show the detected video signals corresponding to the scrambled (inverted) and the descrambled (standard) waveforms of FIGS. 6A and 6D respectively.

Alternate Descrambler—RF Clipped Carrier Method

Referring now to FIG. 7, an alternate circuit for descrambling a television signal is shown in block diagram form. Briefly, the scrambling/descrambling method used is analogous to the previously described baseband video method in that it uses inverse video modulation but the method differs in that the modulation scrambling and descrambling is accomplished at the RF level rather than at the video level.

The scrambled RF signal is applied via the line 36 to the first input of an AGC amplifier 410 whose output is fed to a filter 412. The output of filter 412 is routed via a line 414 to a first input of a combining network 416, and further also via the line 414 to the input of a limiter 418, and to the input of a video detector 420. The output of the limiter 418 is applied via the series connected filter 422, phase shifter 424, level control 426 and a line 428 to a second input of the combining network 416. The output of the video detector 420 is routed to a peak detector 430. The output of the peak detector 430 is applied to a second input of the AGC amplifier 410 via a line 432. As before, the purpose of the video AGC loop is to maintain a substantially constant output RF level on the line 414 for further processing within the descrambler. The AGC loop is of conventional design, is identical to that described in connection with FIG. 5, and it should be noted that the output on line 414 is maintained within predetermined limits by processing of the video signal, especially the 100% white reference pulse previously described.

In operation, the constant peak amplitude RF signal on line 414, is applied to the first input of the combining network 416. The RF signal applied to the limiter 418 is double ended amplitude clipped such that only the carrier waveform emerges, is filtered by filter 422 and routed to the phase shifter 424. The output of phase shifter 424, which introduces a 180° phase shift into the carrier, is then applied via the level control 426 to the combining network 416. Thus the second input to the combining network 416 is a clean carrier reference signal, shifted 180° from the waveform on line 414. The combining network 416 performs the algebraic summation function, providing on the output line 44 a standard television signal.

The waveform of FIG. 8A is a simplified representation of an amplitude modulated composite television waveform wherein the video information has been inversely modulated on the carrier as described in connection with FIG. 4B. This would be representative of the scrambled waveform as applied to the input of the descrambler via the line 36 and as also would appear in amplified form on the line 414. The waveform shown in FIG. 8B represents the output of the 180° phase shift network 424, as would appear on the line 428. It is apparent that when the carrier signal of FIG. 8B is shifted 180° to the carrier of signal of FIG. 8A, and both signals are combined in an algebraic addition process, there would result a signal wherein the higher amplitudes of FIG. 8A would then become the lowest amplitudes in the resulting waveform of FIG. 8C. This is exactly what is accomplished in the combining network 416 and is illustrated in simplified form by the waveform at FIG. 8C.

Dynamic Descrambling—Baseband Video Method

Figure 9:
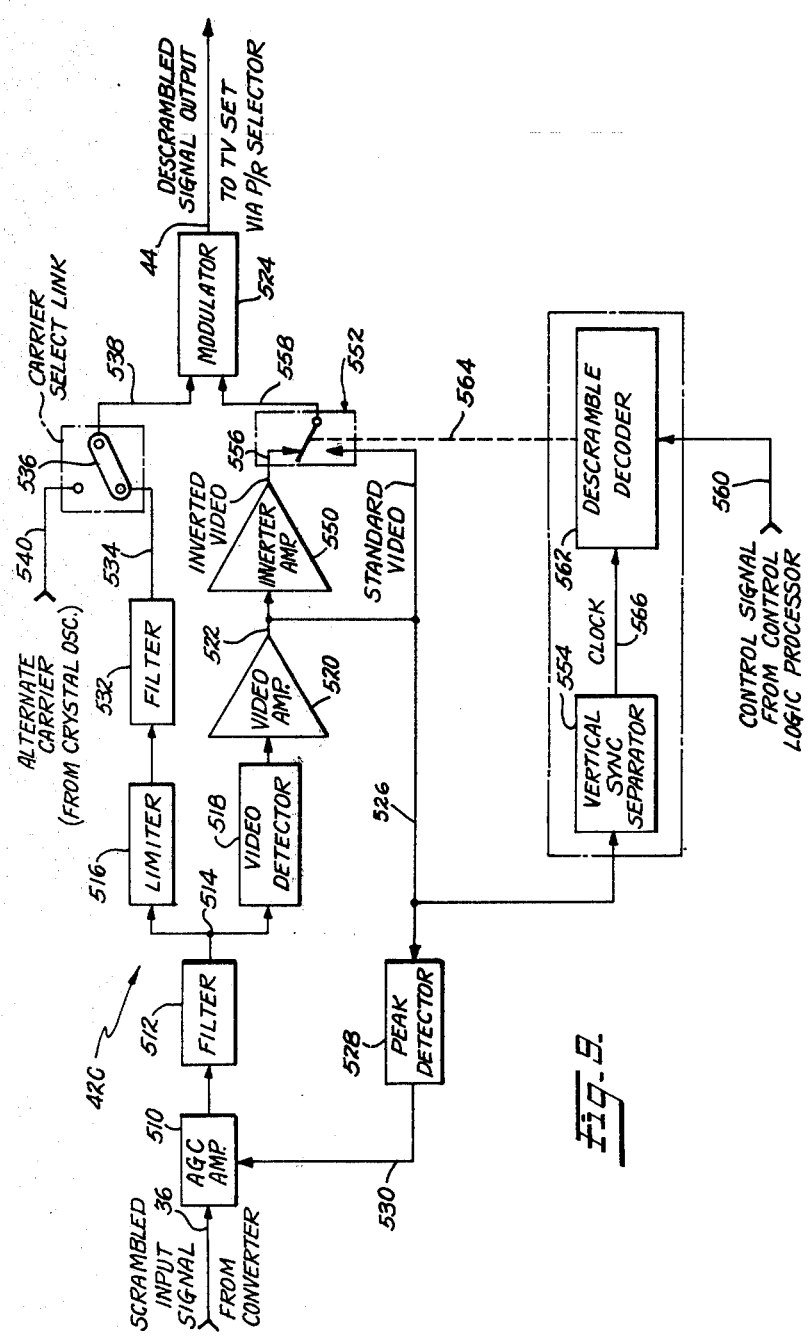
FIG. 9 is a block diagram of an alternate embodiment of a baseband video descrambler, similar to FIG. 5, showing the addition of a dynamic descrambling capability according to the present invention.

An alternate embodiment of a baseband video descrambler including the feature of dynamic descrambling is shown in block diagram form in FIG. 9. The descrambling per se is accomplished identically as the basic embodiment described in connection with FIG. 5, and the major part of the circuitry is the same as in that embodiment. As described, the scrambled input signal, as shown by the waveform of FIG. 6A, is applied via the input line 36. The descrambled output signal, as shown by the waveform of FIG. 6D, is produced on the output line 44 for connection to the subscriber's TV set via the Pay/Regular selector 38. The elements required to accomplish the dynamic descrambling merely alter the video input to the modulator 524 such that both inverted and standard video are selectively made available via a commutating switch actuated by CTS generated coded control signals.

The elements numbered 510 through 538 are identically connected, with the minor exception that lines 522 and 526 are rerouted as clearly shown, as these described with the counterpart numbers 310 through 338 of FIG. 5. Operationally, the elements serve identical purposes. An output from video amplifier 520 is routed via a line 522 to the input of an inverting amplifier 550; and to a first input of a commutating switch 552; and to a peak detector 528; and lastly to the input of a vertical sync separator 554. The video amplifier 520 produces at its output a descrambled baseband video signal when the CTS is transmitting a scrambled signal, and of course, vice versa. The output of inverting amplifier 550 is fed via a line 556 to a second input of the commutating switch 552, whose movable pole is routed via a line 558 to the video input of a modulator 524. The commutating switch 552 is shown, for simplicity, as a single-pole-double-throw switch, but may be any one of a variety of high speed solid state switching means. An input line 560 accepts coded control signals as derived in the control logic processor, as will be described hereinbelow, and routes them to a first input of a descramble decoder 562, which then actuates the commutating switch 552 via the simply shown actuating means 564. The vertical sync separator 554 provides a second input to the descramble decoder 562 via a line 566.

Functionally, the control signals on line 560 provide the real time dynamic orders required to actuate the commutating switch 552 in synchronism with the scrambling scheme being employed at the CTS at the time of transmission. Thus the CTS, which may employ a straightforward algorithm such as scrambling alternate fields; or scrambling selected M out of N fields; or scrambling fields based on a pseudo random selection process, has complete control of the system and the descrambler contains no a priori knowledge of the code in use. To achieve precise synchronism at each subscriber's location, the vertical sync pulses are recovered and used as an auxiliary input to the descrambler decoder to assure that the scramble/descramble transition is effected during the vertical blanking interval.

As with the previously described embodiment, a number of carrier reference signals may be used by insertion into the carrier select link input 540. Also, the peak detector 528 operates to control the AGC loop substantially by use of the 100% white reference pulse, but in addition has available to it the standard sync pulses during those times when an unscrambled signal is being transmitted.

Alternate Descrambler—RF Phase Lock Loop Method

Figure 10:
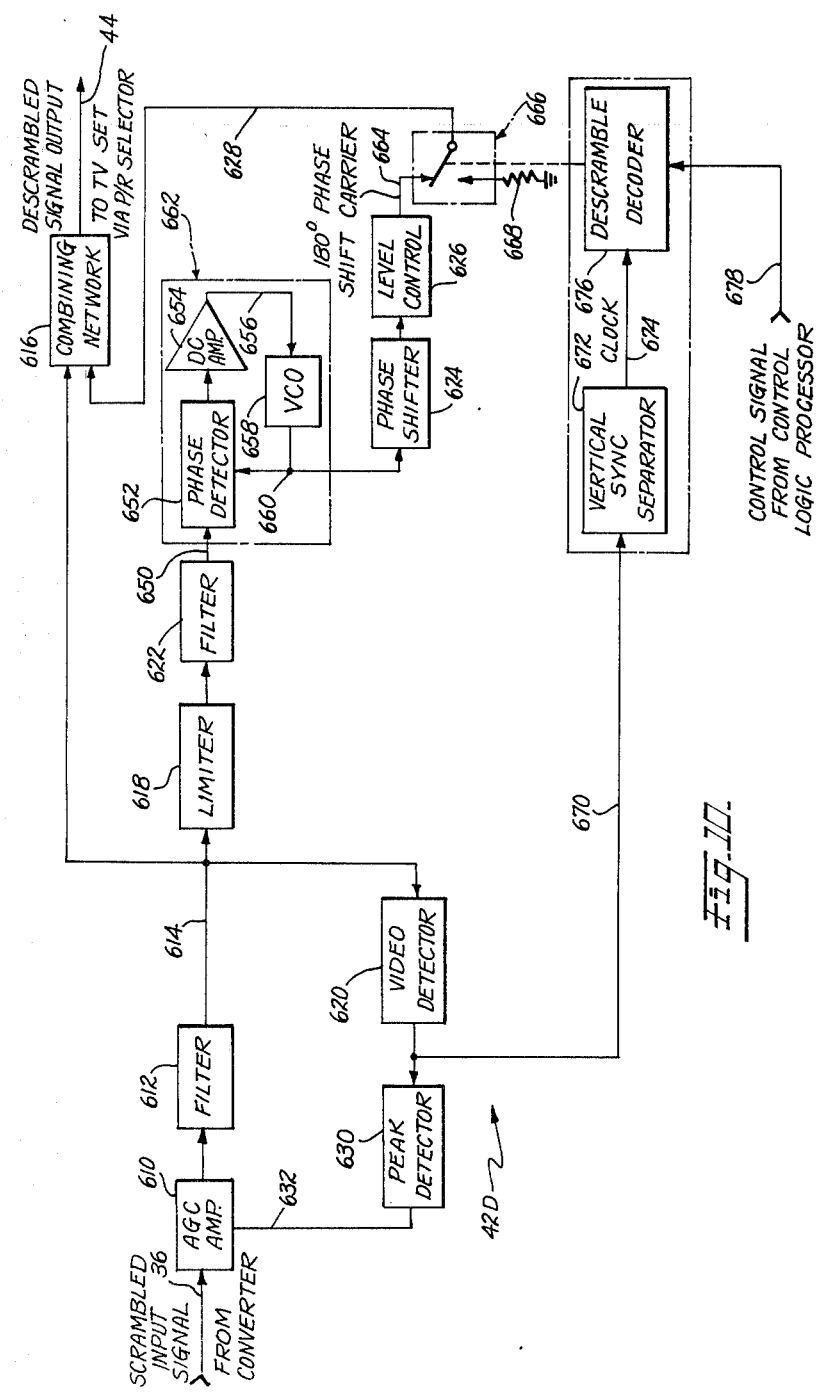
FIG. 10 is a block diagram of a preferred embodiment of an RF level descrambler, similar to FIG. 7, including the features of phase lock loop carrier regeneration, and dynamic descrambling capability according to the present invention.

Referring now to FIG. 10, there is shown a preferred embodiment of the descrambler circuit. This particular embodiment includes selected features from the previous embodiments described. The descrambling of the present embodiment is accomplished at the RF level, as was the embodiment associated with FIG. 7, and includes the use of dynamic codes descrambling, similar to the technique described in connection with FIG. 9. As described, the scrambled input signal, as shown by the waveform of FIG. 8A, is applied via the input line 36. The descrambled output signal, as shown by the waveform of FIG. 8C, is produced on the output line 44 for connection to the subscriber's TV set via the Pay/Regular selector 38. The major additions of the present embodiment being the inclusion of a phase lock loop circuit for regenerating an improved phase stable carrier signal for use in the output combining process, and the inclusion of the dynamic descrambling capability previously described.

The elements numbered 610 through 630 are identically connected (with the exception of the insertion of the phase lock loop 662 into the line 650) as those described with the counterpart numbers of 410 through 430 of FIG. 7. Operationally, they serve the same purposes. An output from a limiter 618 is routed to a filter 622 and thereafter via a line 650 to a first input of a phase detector 652. The output of the phase detector 652 is routed to a DC amplifier 654, whose output is fed via a line 656 to a voltage controlled oscillator (VCO) 658. The output of the VCO is routed via a line 660 to a second input of the phase detector 652 thereby forming a phase lock loop 662. Functionally, the phase lock loop 662 serves to provide a phase coherent carrier for use in the combining network 616. The output of the phase lock loop is further routed via the line 660 to the phase shifter 624 and thereafter to the level control 626. The output of the level control 626 is fed via a line 664 to a first input of a commutating switch 666 whose movable pole is routed via the line 628 to the carrier input of the combining network 616. A terminating resistor 668 is connected to a secondary input of the commutating switch 666. As distinct from the baseband video method wherein alternate polarities of video were required for remodulation as part of the descrambling process, the RF descrambler requires a carrier shifted by 180 degrees to effectively descramble a scrambled signal. For those fields transmitted using standard modulation (unscrambled) in the RF method, no carrier subtraction is required, therefore the termination is used in lieu of a particular signal.

A line 670 routes the output of the video detector 620 to the input of a vertical sync separator 672 and thereafter via a line 674 to an auxiliary input of a descramble decoder 676. A source of coded control signals, as derived in the control logic processor, is connected via the input line 678 to a primary input of descramble decoder 676. Operationally, the control signals on line 678, which originate at the CTS and are processed in the control logic processor, provide the real time dynamic orders to actuate the commutating switch as previously described which synchronously descrambles the television waveform.

Control Logic Processor

Referring now to FIG. 11, there is shown a detailed block diagram of the control logic processor. By referring briefly to FIG. 2, it will be seen that the control logic processor 48 is positioned to operate on the output signals from the FSK control receiver 34, and to provide output control signals to the converter 32 and to the descrambler 42. In operation, the control logic processor 48 receives and processes the downstream control signals from the central transmitting station, validates the received control signals both as to address (subscriber's identification) and function (pay channel frequency tuning), and provides the positive control actuating signals for the channel selecting and descrambling portions of the SCU. The control logic processor 48 is implemented entirely by means of well known, conventional logic circuitry, the elements of which are readily available commerically.

The output from the FSK control receiver 34, as described in connection with FIG. 2, is applied to the input of the control logic processor 48 via the line 46. The input signal being processed is characterized as a biphase encoded digital bit stream in the form of TTL compatible voltage levels. This input signal is applied to a zero crossing detector 710 which reconstitutes the logic signal levels. The output of the zero crossing detector 710 is fed directly to a biphase decoder 712 which provides both the conventional data and clock outputs. At this point it is useful to briefly describe the contents of the incoming digital signals such that the manner of their subsequent processing can be more readily understood. The digital signals consist of a serial bit stream containing an address code and a function code for each of the plurality of subscribers and a descramble code which is used by all of the subscribers being served by the central transmitting station. In a predetermined interval, the serial bit stream contains interleaved messages such that all subscribers in the network are messaged regularly in the predetermined interval. The specific format for the message to each subscriber consists of a 25 bit word. These 25 bits are divided into an 18 bit address code, a 5 bit function code, a single bit descramble code, and a single bit for parity checking. Thus, each subscriber may be unambigiously addressed via his unique 18 bit address code, the 5 bit function code provides for establishing the proper first local oscillator frequency of the conversion unit within the SCU, after validation of the address bits, and the descramble bit is used to synchronously descramble the pay television programs.

The biphase decoder 712 provides the biphase output data stream, and regenerated clock signal, at the bit frequency, to a number of elements within the control logic processor 48. The biphase coded data signal is applied via a line 714 to a data input node of a shift register 716, and to a first input of a serial parity generator 718, and also to a first input of a serial comparator 720. A clock output of the biphase decoder 712 is applied via a line 722 to a first input of a bit counter 724; to a missing pulse detector 726; to a second input of the serial parity generator 718; and to a control gate 727. The output of the control gate 727 is applied via a line 723 to a clock input node of the shift register 716. An address comparator 725 is shown as comprised of a unit address strap 729, a multiplier 730 and the serial comparator 720. The unit address strap 729 provides its output via a plurality of lines 728 to a plurality of first inputs of the multiplier 730. A second plurality of inputs are supplied to the multiplier 730 via a plurality of lines 732, which are provided by the bit counter 724. The output of multiplier 730 is routed directly to a second input of the serial comparator 720. The output of the missing pulse detector 726, which constitutes an unambigious signal designating that the end of a particular 18 bit word transmission has occurred, is provided via a line 734 to a number of locations within the control logic processor 48. The line 734 provides the end of transmission (EOT) signal to a second input of the bit counter 724; to a third input of the serial comparator 720; to a third input of the serial parity generator 718; and to a third input of a control AND gate 736. The serial parity generator 718 provides an output signal via a line 738 to a first input of the control AND gate 736. A first output from the bit counter 724 is supplied via a line 740 to a second input of control gate 727. A second output of the bit counter 724 is applied via a line 742 to a second input of the control AND gate 736. A fourth input to the control AND gate 736 is provided via a line 744 from an output of the serial comparator 720. Thus, when the logically derived conditions required to simultaneously enable all of the four inputs to the control AND gate 736 are present, a strobe output from control AND gate 736 is applied via a line 746 to a command latch 748. The input to the command latch is a plurality of lines via a path 750, which lines contain the function code (channel frequency tuning) and the descramble code portion of the shift register 716 contents. Upon receiving the strobe input on the line 746, the command latch 748 outputs the 5 bit function code via a plurality of lines 752 to a plurality of analog switches 754, and also to a pay program detector 756; and outputs the single descramble bit via a line 758. The pay program detector 756 provides excitation signals to a pay indicator 760 which indicates to the subscriber that a pay program is being received. The output of the analog switches 754, which is a predetermined DC voltage representative of the coded control signals containing the function code (tuning) which had originated at the CTS, is applied via a line 762 to the input 50 of the converter 32 shown in FIG. 3. The descramble signal, an on/off command bit is applied via the line 758 to the inputs 560 of the video descrambler 42C (shown in FIG. 9), or to the input 678 of the RF descrambler 42D (shown in FIG. 10). Thus, the precise voltage required to perform the CATV channel selection function by controlling the frequency of VCO 118 of FIG. 3, and the dynamic descrambling signals for the baseband video descrambler of FIG. 9 (or RF descrambler of FIG. 10) are accomplished.

Figure 12:
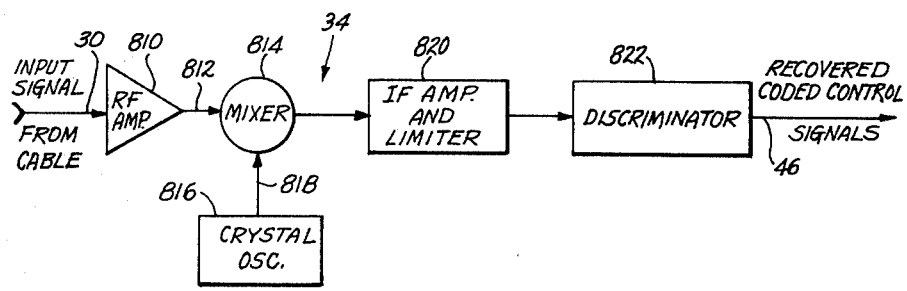
FIG. 12 is a block diagram of an FSK control receiver.

FIG. 12 is a detailed block diagram of the PSK control receiver, shown in more general form in FIG. 2 as the system block 34. Briefly, the purpose of this section of the subscriber's control unit is to extract the coded control signals from the cable-carried signal and to provide them at baseband logic level to the control logic processor shown in FIG. 2 as the block 48. The receiver thus demodulates the logic data which had been frequency shift keyed on a VHF subcarrier at the central transmitting station.

The input signal is applied via the line 30 to a tuned RF amplifier 810 which allows the passage only of the desired band of VHF frequencies which contain the biphase encoded control signals. The output of the RF amplifier 810 is routed via a line 812 to a first input of a mixer 814. The output of a fixed frequency crystal oscillator 816 is applied via a line 818 to a second input of the mixer 814. The output of the mixer 814 is applied to an IF amplifier/limiter 820, and thereafter to a discriminator 822. The output of the discriminator 822 is available via the line 46 for subsequent use in the control logic processor as will be described.

An exemplary embodiment may be implemented using straightforward frequency shift keying (FSK) at the central transmitter station to represent the biphase coded control signals. As only binary information is to be handled by this portion of the system, only two discrete frequencies are transmitted, received and processed. After amplification and limiting in the IF amplifier and limiter 820, the resulting signal, which at this point is one of the two discrete frequencies representing either a logic "1" or "0", is routed to the conventional discriminator 822 which produces two DC levels corresponding to the two frequencies being processed. The output levels are compatible with a wide range of solid state logic processors, including conventional TTL logic levels.

Typical frequencies of an illustrative embodiment of the FSK receiver are as follows. The center frequency of the RF amplifier 810 may be 116.5 MHz, and the amplifier may have an effective bandwidth of 500 kHz; the crystal oscillator 818 may be set to 110.5 MHz (derived from a master oscillator of 27.625 MHz which has been frequency multiplied by a factor of 4); the center frequency of the IF amplifier 820 may be set to 6 MHz.

FIG. 13 is a detailed block diagram of a preferred, highly stable embodiment of the subscriber's control unit. Functionally, this embodiment carries out the same processes as the SCU described in connection with FIG. 2, and includes the elements shown there plus the additional elements described below. Reference numerals 932 through 952 are connected identically as were the corresponding reference numerals 32-52 of FIG. 2. Briefly, the input signal from the cable is applied via the line 30, where it is processed by a converter 932 and an FSK control receiver 934. Subsequent to the complete television signal processing as described previously, the output signal is routed via a Pay/Regular selector 938 to the output terminal 40 for connection to and use by a conventional TV receiver at the subscriber's location.

In the descriptions of various embodiments of the major elements of the SCU, the use of predetermined reference frequencies were specified for performing a number of functions. For example, the FSK control receiver 34 calls for a 110.5 Mhz signal for use as its local oscillator. The present embodiment shows a configuration wherein a master oscillator 960, and a plurality of related frequency multipliers 960A-960C provide the key reference frequencies required throughout the SCU. The master oscillator 960, which may be a highly stable crystal controlled oscillator, has its basic frequency chosen such that predetermined multiples of that frequency provide a set of harmonically related frequencies for the uses outlined. Specifically, a basic master oscillator frequency of 27.625 MHz may be multiplied by a factor of two in multiplier 960A and routed to line 152 (of FIG. 3) of converter 932, thereby providing a carrier reference frequency of 55.25 Mhz to the converter 932 and establishing the desired output frequency of the converter 932 for compatibility with VHF broadcast channel two. A second multiplication by two is done in multiplier 960B and applied via the line 540 (of FIG. 9) to the descrambler 942, the preferred embodiment of the RF level dynamically descrambled unit, to provide a precise, stable reference carrier source also at 55.25 Mhz. A third multiplier 960C provides frequency multiplication by a factor of four to yield a signal at 110.5 Mhz which is applied via the line 813 (of FIG. 12) thereby providing the local oscillator signal for FSK control receiver 934. The particular frequencies cited represent one successful configuration for implementing a SCU, obviously other combinations are also possible. The resulting SCU is characterized by a high degree of stability, reducing the need for frequent adjustments both by subscriber's and at the central transmitting station. Also, the RF descrambling method which requires a high degree of phase coherence of its carrier signal for proper stable combining operation is greatly enhanced when implemented using the above SCU embodiment.

Although the invention has been described in terms of selected preferred embodiments, the invention should not be deemed limited thereto, since other embodiments and modifications will readily occur to one skilled in the art. It is therefore to be understood that the appended claims are intended to cover all such modifications as fall within the true spirit and scope of the invention.

What is claimed is:

1. A method of operating a subscription television system, comprising the steps of:
   I. At a central transmitting station:
   (a) generating a standard television signal having a video signal component with predetermined amplitude and polarity relationships;
   (b) scrambling and amplitude modulating successive fields of the standard television signal in a time-coded way so as to provide a complete scrambled amplitude modulated television signal which has said predetermined polarity reversed for at least some fields thereof, and which is amplitude modulated on a channel carrier having a first frequency in the CATV channel assignments;

(c) generating a coded control signal stream having first portions containing respective subscriber addresses, second portions identifying the channel carrier frequency, and third portions containing scrambling signals which identify the polarity of each field of the complete scrambled television signal;

(d) modulating the coded control signal stream on a code carrier having a second frequency different from said first frequency, in the CATV channel assignments; and (e) transmitting the complete scrambled television signal and the modulated coded control signal stream to at least one subscriber control unit.

2. The method of claim 1, wherein the standard television signal includes vertical sync pulse intervals appearing at a vertical sync frequency and a blanking period preceding each vertical sync pulse interval, and step I.(b) comprises:

providing the standard television signal at baseband to a first input of a scrambling commutator;

inverting the standard television signal at baseband;

generating an amplitude reference pulse during each blanking period preceding the vertical sync pulse interval of the standard TV signal;

summing and providing to a second input of the scrambling commutator the inverted standard television signal and the amplitude reference pulses;

actuating the scrambling commutator to alternately provide at an output thereof the signals provided to the first and second inputs thereof, the scrambling commutator being actuated at some multiple of the vertical sync frequency of the standard television signal to produce a time-chopped scrambling sequence in synchronism with a frame rate of the standard television signal, the time-chopped scrambling sequence having an arbitrarily long repetition cycle; and amplitude modulating the complete scrambled television signal appearing at the output of the scambling commutator on said channel carrier to produce a signal of the vestigial sideband suppressed type.

3. The method of claim 1, wherein step I.(b) comprises:

generating said channel carrier;

amplitude modulating the standard television signal on said channel carrier to produce a signal of the vestigial sideband suppressed type;

phase shifting said channel carrier by 180 degrees;

level controlling and supplying the phase-shifted channel carrier to a first input of a scrambler commutator;

actuating the scrambler commutator to alternatively provide and not provide the level-controlled and phase-shifted channel carrier as an output signal thereof, the scrambling commutator being actuated at some multiple of a vertical sync frequency of the standard television signal to produce a time-chopped scrambling sequence in synchronism with a frame rate of the standard television signal, the time-chopped scrambling sequence having an arbitrarily long repetition cycle; and algebraically summing the modulated standard television signal and the output signal of the scrambler commutator to produce the complete scrambled television signal.

4. The method of claims 1, 2, or 3, further comprising the steps of:

II. at said subscriber control unit:

(a) receiving the complete scrambled amplitude-modulated television signal and the modulated coded control signal stream;

(b) demodulating the coded control signal stream;

(c) determining whether one of said first portions of the coded control signal stream matches a local address code, and providing an enabling signal when a match is found;

(d) tuning a local oscillator to a first local oscillator frequency corresponding to said channel carrier frequency, in dependence on said second portions of the coded control signal stream, when said enabling signal is provided;

(e) mixing the modulated completed scrambled amplitude modulated television signal with the first local oscillator frequency to produce an intermediate-frequency scrambled television signal;

(f) mixing the intermediate frequency scrambled television signal with a second local oscillator frequency to produce the complete scrambled television signal amplitude modulated on an RF carrier detectable by a conventional TV receiver;

(g) regulating said first local oscillator frequency such that the complete scrambled television signal amplitude modulated on the RF carrier is maintained at a constant frequency and is phase-stable; and (h) descrambling the complete scrambled television signal amplitude modulated on the RF carrier to produce said standard television signal modulated on the RF carrier in a form detectable by a conventional television receiver.

5. The method of claim 4, wherein step II.(h) comprises:

amplitude envelope detecting the video signal component of the complete scrambled television signal amplitude modulated on the RF carrier;

producing a channel carrier information signal; and modulating the channel carrier information signal with the amplitude-envelope detected video signal component to produce said standard television signal amplitude modulated on the RF carrier in a form detectable by a conventional television receiver.

6. The method of claim 5, wherein the step of producing the channel carrier information signal comprises amplitude clipping and filtering the complete scrambled television signal amplitude modulated on the RF carrier to obtain the channel carrier information signal.

7. The method of claim 6, wherein step II.(h) further comprises:

peak detecting and maintaining substantially constant the peak amplitude of the amplitude-envelope detected video signal component.

8. The method of claim 4, wherein step II.(h) comprises:

amplitude clipping and filtering the complete scrambled television signal amplitude modulated on the RF carrier to obtain a channel carrier information signal;

phase shifting the channel carrier information signal by 180 degrees; and algebraically combining the complete scrambled television signal amplitude modulated on the RF carrier with the phase-shifted channel carrier information signal to restore said standard television signal amplitude modulated on the RF carrier in a form detectable by a conventional television receiver.

9. The method of claim 8, wherein step II.(h) further comprises:
   amplitude envelope detecting the video signal component of the complete scrambled television signal amplitude modulated on the RF carrier;
   peak detecting the amplitude-envelope detected video signal component; and
   regulating the amplitude of the complete scrambled television signal amplitude modulated on the RF carrier to maintain substantially constant the peak amplitude of the amplitude-envelope detected video signal component.

10. The method of claim 4, wherein step II.(h) comprises:
    producing a channel carrier information signal,
    amplitude envelope detecting and providing to a first input of a descrambling commutator the video signal component of the complete scrambled television signal amplitude modulated on the RF carrier;
    inverting and providing to a second input of the descrambling commutator the amplitude-envelope detected video signal component;
    actuating the descrambling commutator in dependence on said third portions of the coded control signal stream to provide the amplitude-envelope detected video signal in descrambled form as an output of the descrambling commutator; and
    modulating the channel carrier information signal with the descrambled amplitude-envelope detected video signal to restore the standard television signal amplitude modulated on the RF carrier in a form detectable by a conventional television receiver.

11. The method of claim 10, wherein the step of producing the channel carrier information signal comprises:
    amplitude clipping and filtering the complete scrambled television signal amplitude modulated on the RF carrier to obtain the channel carrier information signal.

12. The method of claim 11, wherein step II.(h) further comprises:
    peak detecting and maintaining substantially constant the peak amplitude of the amplitude-envelope detected video signal component.

13. The method of claim 4, wherein step II.(h) comprises:
    amplitude clipping and filtering the complete scrambled television signal amplitude modulated on the RF carrier to obtain a channel carrier information signal;
    detecting the phase of the channel carrier information signal in a phase lock loop to obtain a phase-coherent channel carrier;
    phase shifting by 180 degrees and providing to a commutating switch the phase-coherent channel carrier;
    actuating the commutating switch in dependence on said third portions of the coded control signal stream to alternately provide and not provide as an output signal thereof the phase-shifted phase-coherent channel carrier; and
    algebraically combining the complete scrambled television signal amplitude modulated on the RF carrier with the output signal of the commutating switch to restore the standard television signal amplitude modulated on the RF carrier in a form detectable by a conventional television receiver.

14. The method of claim 13, wherein step II.(h) further comprises:
    amplitude envelope detecting the video signal component of the complete scrambled television signal amplitude modulated on the RF carrier;
    peak detecting the amplitude-envelope detected video signal component; and
    regulating the amplitude of the complete scrambled television signal amplitude modulated on the RF carrier to maintain substantially constant the peak amplitude of the amplitude-envelope detected video signal component.

15. A method of operating a subscription television system, comprising the steps of:
    at a subscriber control unit:
    (a) receiving a complete scrambled television signal which has a video signal component with reversed polarity for at least some fields thereof and which is amplitude modulated on a channel carrier having a first frequency in the CATV channel assignments;
    (b) receiving a coded control signal stream having first portions containing respective subscriber addresses, second portions identifying the channel carrier frequency, and third portions containing scrambling signals which identify the polarity of each field of the complete scrambled television signal, the coded control signal stream being modulated on a code carrier having a second frequency, different from said first frequency, in the CATV channel assignments;
    (c) demodulating the coded control signal stream;
    (d) determining whether one of said first portions of the coded control signal stream matches a local address code, and providing an enabling signal when a match is found;
    (e) tuning a local oscillator to a first local oscillator frequency corresponding to said channel carrier frequency, in dependence on said second portions of the coded control signal stream, when said enabling signal is provided;
    (f) mixing the modulated complete scrambled amplitude modulated television signal with the first local oscillator frequency to produce an intermediate-frequency scrambled television signal;
    (g) mixing the intermediate frequency scrambled television signal with a second local oscillator frequency to produce the complete scrambled television signal amplitude modulated on an RF carrier detectable by a conventional television receiver;
    (h) regulating said first local oscillator frequency such that the complete scrambled television signal amplitude modulated on the RF carrier is maintained at a constant frequency and is phase-stable; and
    (i) descrambling the complete scrambled television signal amplitude modulated on the RF carrier to produce a standard television signal amplitude modulated on the RF carrier in a form detectable by a conventional television receiver.

16. A method of operating a subscriber control unit for use in a subscription television system using coded control signals originating at a central transmitting station comprising:
   (a) receiving any one of a plurality of channels, at least one of which may be in scrambled form;
   (b) receiving and processing coded control signals;
   (c) converting said at least one scrambled channel to a predetermined frequency band in part by tuning a variable frequency oscillator in response to said coded control signals; and
   (d) descrambling said converted channel in response to said coded control signals rendering the resultant descrambled channel directly usable on a conventional television receiver, wherein said step of descrambling said converted channel comprises:
   receiving a converted channel signal comprised of an inverted video television waveform;
   amplifying and detecting said inverted video signal to obtain a detected video signal;
   clipping and filtering said inverted video signal to obtain a continuous wave carrier signal; and
   modulating said continuous wave carrier signal with said detected video signal to obtain a descrambled channel directly usable on a conventional television receiver.

17. The method of claim 16, further including the step of peak detecting said detected video signal for maintaining a substantially constant peak amplitude video signal input to the modulator.

* * * * *